United States Patent
Mittas

(10) Patent No.: US 6,288,473 B1
(45) Date of Patent: Sep. 11, 2001

(54) FREQUENCY MODULATION DRIVE FOR A PIEZOELECTRIC MOTOR

(75) Inventor: Anthony Mittas, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/540,633

(22) Filed: Mar. 31, 2000

(51) Int. Cl.[7] ................................................ H02N 2/14
(52) U.S. Cl. ................ 310/317; 310/323.02; 310/323.03
(58) Field of Search ........................... 310/317, 323.02, 310/323.03

(56) References Cited

U.S. PATENT DOCUMENTS

| | | | |
|---|---|---|---|
| 4,275,363 | * 6/1981 | Mishiro et al. | 310/316.01 |
| 4,901,034 | * 2/1990 | Frank-Peter | 310/316.01 |
| 5,214,339 | * 5/1993 | Naito | 310/316.01 |
| 5,661,359 | * 8/1997 | Katsuragawa | 310/316.01 |
| 5,719,461 | 2/1998 | Peclat et al. | 310/323 |
| 5,777,860 | * 7/1998 | Halbert | 310/316.01 |
| 5,834,876 | 11/1998 | Luthier et al. | 310/316 |
| 5,955,819 | * 9/1999 | Takano et al. | 310/317 |

FOREIGN PATENT DOCUMENTS

| | | | |
|---|---|---|---|
| 63-56179 | * 3/1988 | (JP) | 310/317 |
| 1-148080 | * 6/1989 | (JP) | 310/317 |
| 8-214570 | * 6/1989 | (JP) | 310/317 |
| 7-123754 | * 5/1995 | (JP) | 310/317 |

\* cited by examiner

*Primary Examiner*—Thomas M. Dougherty
(74) *Attorney, Agent, or Firm*—George H Libman

(57) ABSTRACT

A piezoelectric motor has peak performance at a specific frequency $f_1$ that may vary over a range of frequencies. A drive system is disclosed for operating such a motor at peak performance without feedback. The drive system consists of the motor and an ac source connected to power the motor, the ac source repeatedly generating a frequency over a range from $f_1-\Delta x$ to $f_1+\Delta y$.

9 Claims, 5 Drawing Sheets

FREQUENCY MODULATION DRIVE FOR A PIEZOELECTRIC MOTOR

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

Piezoelectric (piezo) rotary motors have found their way into industrial applications where high torque, low rpm requirements are needed in small volumes. Magnetic flux motors are typically large, have a high rpm, and require gear reduction mechanisms to reduce speed. However, Shinsei Corporation produces 30 and 60 mm diameter piezoelectric or ultrasonic motors for testing and product applications. Other Japanese piezo motor manufacturers have incorporated 60 mm diameter motors in automobile seat and steering column adjustments while some have been used in window blind motorized mechanisms. These applications all require high torque, low speed outputs within a small volume.

Honeywell Federal Manufacturing and Technologies (H-FM&T), Kansas City, Mo., has developed and marketed a 17 mm diameter motor for military testing, evaluation, and applications. More recently, H-FM&T has developed jointly with Sandia National Laboratories, Albuquerque, N. Mex., an 8 mm diameter rotary piezo motor. Early evaluation of this 8 mm motor showed that the drive frequency required to operate the motor at its highest output torque and speed is the most critical variable associated with its operation. Experimental evaluation showed that many other variables also effect the operating frequency. Most importantly for many applications, temperature has the largest effect on the operating frequency. Since the operating frequency shifts as a function of temperature, the drive electronics design must be able to shift the drive frequency to maintain optimum performance from the motor.

8 mm DIAMETER ROTARY PIEZOELECTRIC MOTOR

FIG. 1 shows an exploded view of the H-FM&T 8 mm diameter rotary motor 10 which consists of a piezo ring 12 that is bonded to a circular stator 14. The other side of the piezo element is metallized with two half circle metal contacts (not shown) electrically isolated from each other. The piezo element is permanently poled in alternating sections around the ring circumference prior to bonding to the stator. The piezo material sandwiched between stator 14 and each metallized contact of ring 12 can be thought of as two electrically independent piezo elements.

Stator 14 is one continuous piece of metal in the shape of a wheel about 8 mm in diameter, thicker around the outside circumference 15. Radial cuts are made in this thicker part 15 of stator 14 opposite bonded piezo elements on ring 12 prior to bonding the elements. The radial cuts have the appearance of teeth 16 radially cut along the motor circumference. It is the action of these stator teeth- that produce motion and cause a piezo motor to operate.

Electrical contacts 17–19 at one end of a ribbon cable 20 are connected at the other end of cable 20, respectively, to each element of ring 12 and to stator 14. When an ac voltage is applied between one element's electrical contact and the stator, the poled ceramic piezo effect causes a standing wave to develop around the stator circumference. Applying two 90° out phase signals to the two contacts creates two standing waves 90° out phase which is the equivalent of a traveling wave around the motor circumference. For the 8 mm motor 10, the traveling wave is three-wave, or it has three minima and three maxima while traveling around the stator circumference. This is the desired mode although other vibrational modes exist.

The traveling wave imparts an elliptical motion on the top surface of each tooth 16 from the traveling wave maxima and minima passing along the stator circumference. The top surface of a stator tooth 16 at a traveling wave peak has a maximum vertical displacement and its direction of travel is parallel to the top surface of the stator. Something is placed in contact with the top surface of tooth 16 will be moved in the same direction as the tooth. Typically in a rotary motor a rotor is pressed against the stator and the teeth move the rotor.

The rotor 22 shown in FIG. 1 has machined gear teeth 24 around its circumference. The rotor 22 is the part of motor 10 that turns and causes mechanical action in an application. The rotor 22 is held in place with a shaft 24, bearing 27, and spring washer 28. When motor 10 is assembled, the spring 28 forces a surface of rotor 22 onto the stator teeth 16. When the traveling wave is induced in the stator 14, the stator teeth 16 move in the elliptical motion described above and they push the rotor 22 along by making contact between the stator and rotor at three locations corresponding to the three maxima of the traveling wave. To reduce wear on the metal surfaces, a friction liner 26 is placed between the stator teeth 16 and the rotor 22.

The amount of force that spring 28 applies to hold the rotor on the stator is called the motor preload. When the preload applied is very low, the motor will have a high rpm and very low torque. When the preload is very high the motor will have low rpm and high torque, and may not turn at all. Somewhere between these two values of preload is a point where the motor has optimum speed and torque.

A data point on the torque-speed curve represents the preload setting for the motor optimum performance, which is also a function of operating frequency. The data point is determined experimentally by setting the preload, sweeping through a range of frequencies, and measuring torque and speed. Next the preload is increased and the curve is generated again. This procedure is repeated until the optimum torque-speed is found at a particular preload and at a specific frequency, $f_1$.

The peak motor performance is also effected by the ac voltage magnitude applied to the two piezo elements. At lower voltages the stator teeth 16 have smaller elliptical motion and therefore less rotor movement, and at higher drive voltages the piezo element can break down electrically or be stressed to the point of fracture. The peak motor performance data point is dependant on the motor preload, the drive voltage amplitude, and the drive voltage frequency.

With all of these variables taken into account, one can empirically determine the operating frequency the 8 mm rotary piezo electric motor requires for its peak performance. However, because of manufacturing variables, it is difficult to make motors with identical, predictable, performance. Even with the best fabrication process on a group of motors processed at one time: 1) all the piezo elements will be somewhat different in thickness, shape, poling, etc. due to tolerances and material characteristics 2) all the springs will not have the same force for the same deflection, 3) all the piezo elements will not be bonded in the precisely the same location on all the stators, 4) all the stators will not be machined in precisely the same shape, 5) all the bearings may not have the same friction properties, etc. All of these imperfections and tolerance variations in fabrication can and do have an effect on the motor performance and also the motor operating frequency.

When one factors in variations in performance that also may result from changes in temperature and voltage, it becomes obvious that because $f_1$ varies both with time in a particular motor and across a sample of motors, a constant frequency motor drive circuit is not an optimal solution for operating these motors. Another method of controlling the operating frequency must be implemented that is automatic for all variables mentioned above.

FIG. 2 shows the equivalent circuit for the 8 mm rotary piezo electric motor 10. It is made up of two one-element circuits with a common node. The com contact in FIG. 2 is the common connection between the two piezo elements and is also the connection to the stator web. The sin and cos inputs are the metallized surfaces of the two half circle piezo elements. The three conductor cable 20 in the motor exploded view in FIG. 1 allows access to the sin, cos, an com nodes and is used to apply the drive voltages to the piezo elements.

Typically Cshunt and the RLC resonant circuit comprised of Rm, Lm, and Cm make up the equivalent circuit, but for the purpose of analysis, two more resonant vibrational modes are included which are made up of, R1, L1, C1, and R2, L2, C2. The values of Rm, Lm, and Cm are calculated by an impedance analyzer for an equivalent circuit with same configuration. These components represent the equivalent circuit motional leg. The two upper RLC legs in FIG. 2 may represent the two or four traveling wave modes, the "oil can" mode (vibration of the entire motor along the shaft), or any other undesirable vibration mode that may exist in an electrically excited element. The motional leg represents the desired three-wave vibration that exists from the two ±90° voltage signals applied on the two elements. The current in this leg of the equivalent circuit is called the motional current or Im, and is proportional to the vibration velocity of the elliptical motion in the stator teeth.

DRIVE ELECTRONICS FOR PIEZOELECTRIC MOTOR

Two drive signals, sin and cos, are required to operate a rotary piezo motor. The two signals must be 90° out of phase and approximately 160–240 Vpp. The disclosed design uses transformers because operational amplifiers were not robust enough for the intended environment where the circuit was designed for operation. Operational amplifiers have been used in less severe environments.

The design concept for the motor driver shown in FIG. 3 uses a dual primary transformer in a push-pull configuration to create a positive and negative going output at the single winding secondary output. Four FETs and two transformers are used to create the two drive signals. As shown in FIG. 4, the inputs sin and sin_not, are 180° out of phase from each other as are cos and cos_not. Sin and cos are 90° out of phase as are sin_not and cos_not. Sin and sin_not turn on two FETs, alternating one at a time, and swing one transformer secondary voltage positive and negative. Cos and cos_not drive the FETs of the second transformer.

The transformer of FIG. 3 is a special design 704 core (7 mm diameter, 4 mm height) with Magnetics J material from ETI Inc., Olathe, Ky. The turns ratio is 6.67 with approximately 30 turns on the primary and 200 turns on the secondary. The transformer model for circuit simulation is shown in FIG. 5. The component values are determined from impedance measurements of the primary and secondary windings.

The sin, sin_not, cos, and cos_not inputs to the circuit in FIG. 3 are the outputs from the digital circuit in FIG. 6. This circuit requires an input frequency that is twice the motor operating frequency. The circuit divides the input frequency, 2f, by two to create the four digital drive signals. The Direction input changes the phase between sin and cos by 180° which changes the motor direction. The Motor Drive input enables the 74HC08 AND gate outputs and allows the four digital drive signals to pass through.

The four digital outputs from the 74HC08 AND gates are the inputs to two TSC4427A FET drivers. These outputs have high output current capability to quickly charge and discharge the gate capacitance of the IRFF130 FETs in FIG. 3. FIG. 4 shows simulated output waveforms from the 74HC08 outputs along with the changing conditions on the inputs. Note the change in phase between sin and cos with the level change in the Direction input. Also note that the outputs are active only when the Motor Drive input is high and their frequency is half that of 2f input. The outputs from the FET drivers have the same timing as the four digital signals but their amplitudes are at Vin or 12 V.

Although the outputs of the aforementioned circuits are required for the operation of the piezoelectric motor 10, these particular circuits are disclosed merely as an example of circuitry which may be utilized to provide these outputs. The details of these circuits are not part of this invention.

In the early stages of the 8 mm rotary piezo motor development, it was understood that the shifts in the motor peak performance operating frequency due to temperature, and the variations in performance among multiple motors, would require frequency control in the drive electronics. Initial thoughts were to use a temperature sensor as an input to a microprocessor circuit implementing a lookup table based on experimental results to control the frequency at each temperature. Difficulties in adapting the microprocessor to other environmental hazards and non-repeatable variability in motors quickly diminished hopes of implementing this method in this environment.

SUMMARY OF THE INVENTION

It is an object of this invention to provide a control system that maximizes the output of a frequency dependent motor without feedback from the motor.

To achieve the foregoing and other objects, and in accordance with the purpose of the present invention, as embodied and broadly described herein, the present invention may comprise a frequency modulation drive system for an ac device (such as a piezoelectric motor) that has peak performance at a specific frequency $f_1$ that may vary over a range of frequencies, without feedback from the device. The drive system consists of the ac device and an ac source connected to power the ac device, the ac source repeatedly generating a frequency over a range from $f_1-\Delta x$ to $f_1+\Delta y$.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

The drive electronics are required to track the operating frequency of a piezoelectric motor, but the same circuit must also work for all motors. Consider that a motor has a frequency range that it will operate over and a specific frequency within that range where its performance is optimum. This motor peak performance frequency (PPF) is determined experimentally for each motor at each preload and is the desired frequency that the drive electronics are required to track. Now consider that every motor is different and that every motor has a different operating frequency range and a different PPF from all the others. As long as the PPFs of a group of motors fall within a relatively narrow band, a circuit can be designed that sweeps a range of frequencies that includes the narrow band which, in turn, brackets the group of motors PPFs.

As disclosed herein, the motor frequency is swept through its PPF enough times in an operating cycle so that the motor will have the chance to operate its mechanism. That is to say, even if a load on the motor is so great that the motor will only operate the load at its PPF, the sweep rate frequency must be such that the motor's PPF is passed through enough times so that the motor will have enough time to function the load.

Figure 1:
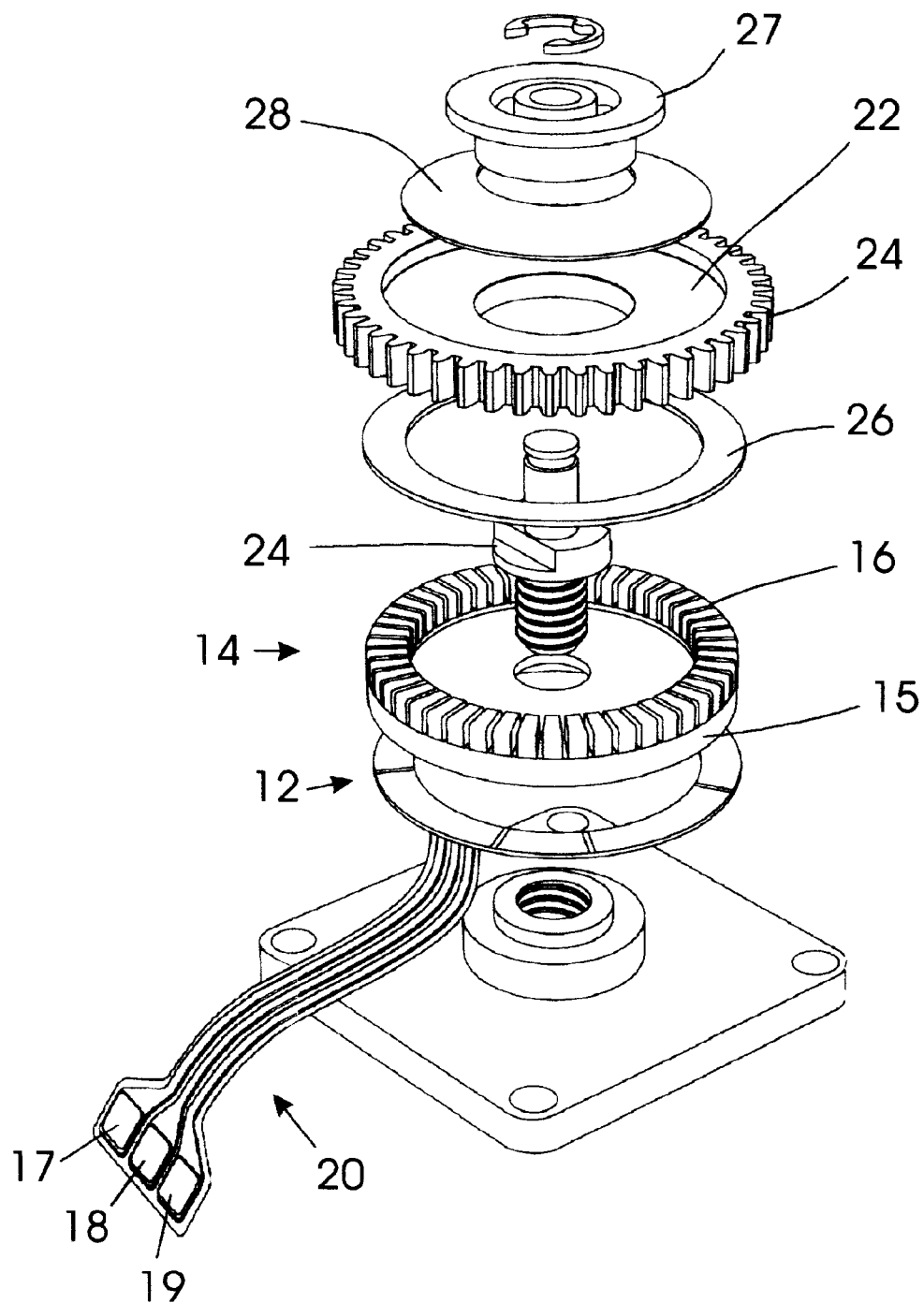
FIG. 1 shows a prior art piezoelectric motor.
Figure 2:
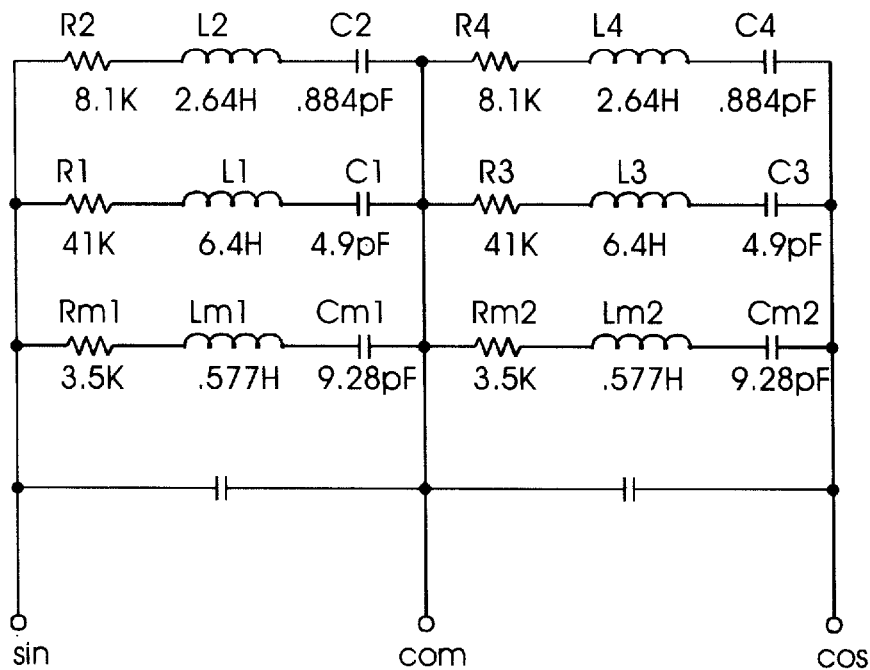
FIG. 2 shows an equivalent circuit of the motor of FIG. 1
Figure 3:
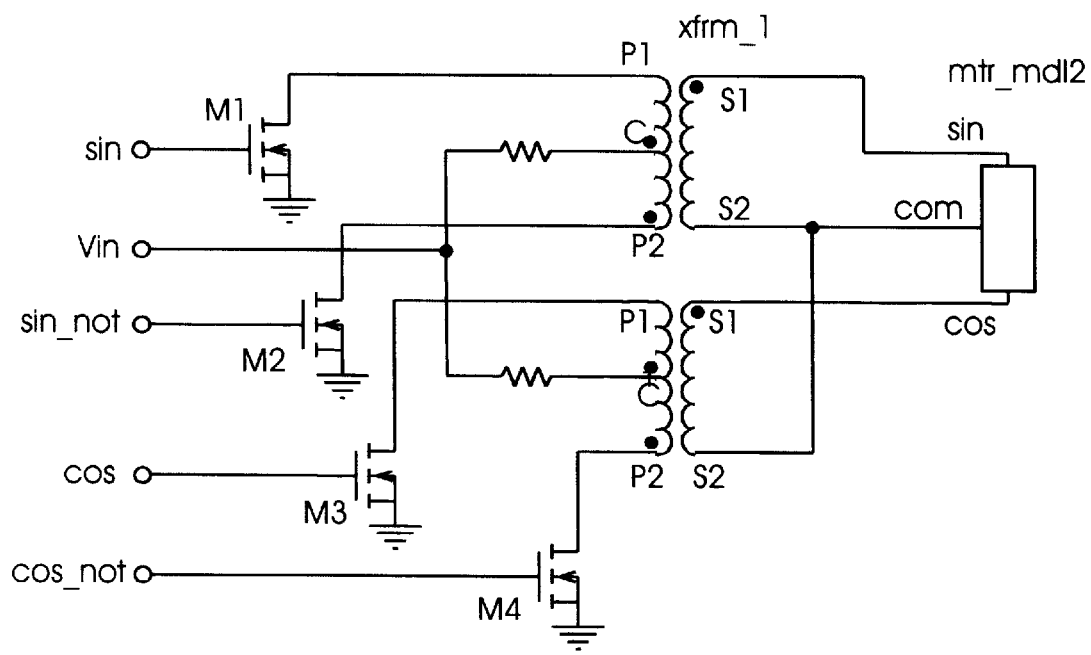
FIG. 3 shows the prior art drive circuit for the motor of FIG. 1
Figure 4:
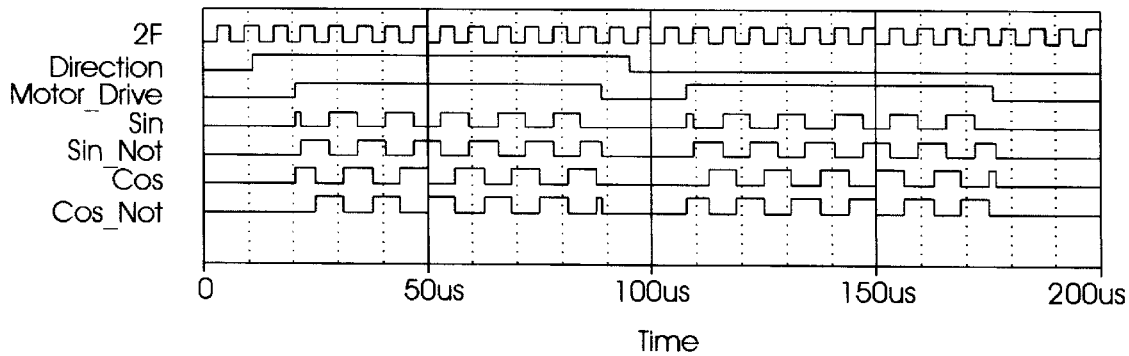
FIG. 4 shows the waveforms of the circuits of FIGS. 3 and 6.
Figure 5:
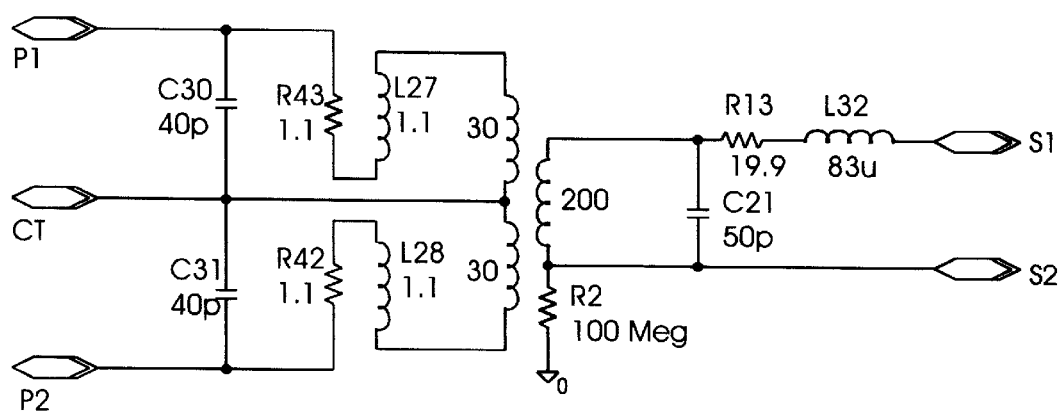
FIG. 5 shows the transformer of the circuit of FIG. 3.
Figure 6:
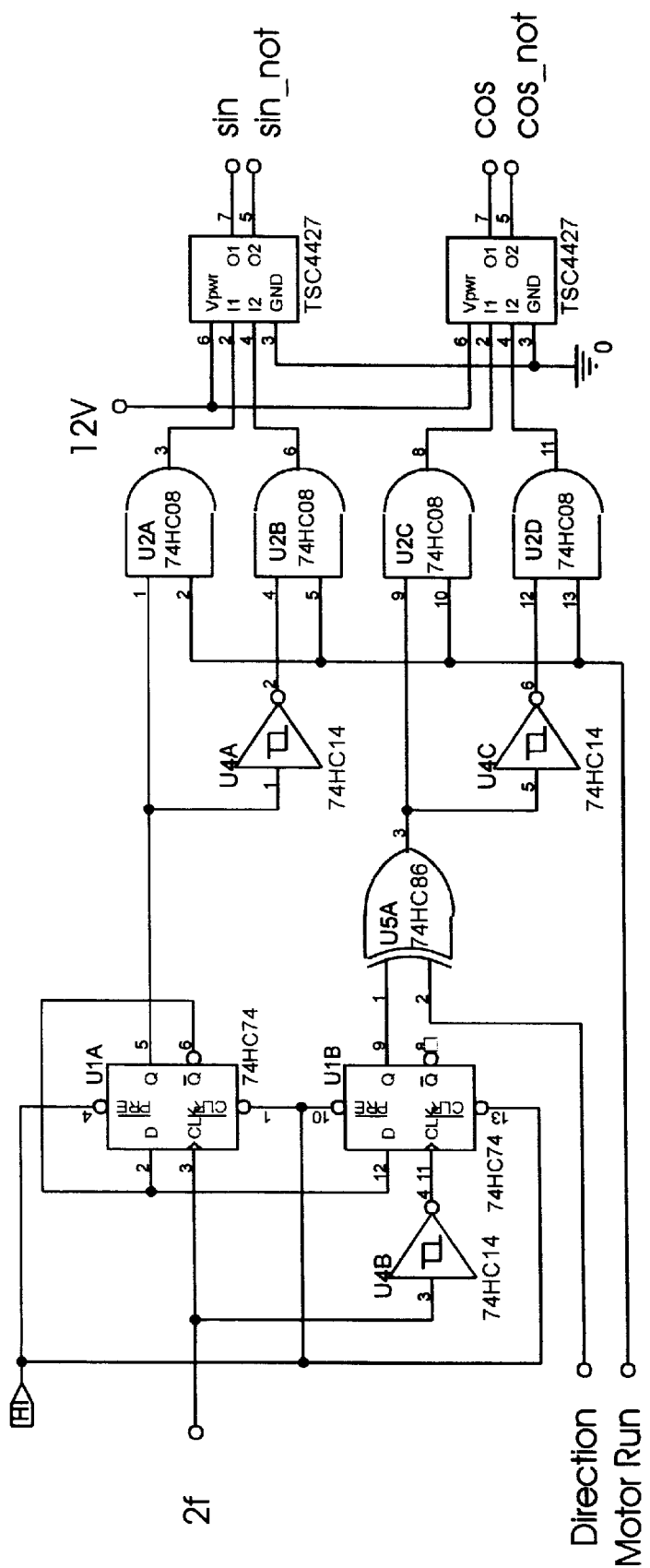
FIG. 6 shows the prior art input circuit to the drive circuit of FIG. 3.

In accordance with this invention, the input frequency 2f of the circuit of FIG. 6 is swept repeatedly and continuously over a sufficient range, 2f±Δf, that the output sin, cos from the circuit of FIG. 3 covers the PPF of all motors likely to be used with the circuit. The circuit in FIG. 7 discloses a preferred embodiment of a frequency modulation circuit used to sweep a narrow band of motor drive frequencies that will operate 8 mm piezo motors.

Figure 7:
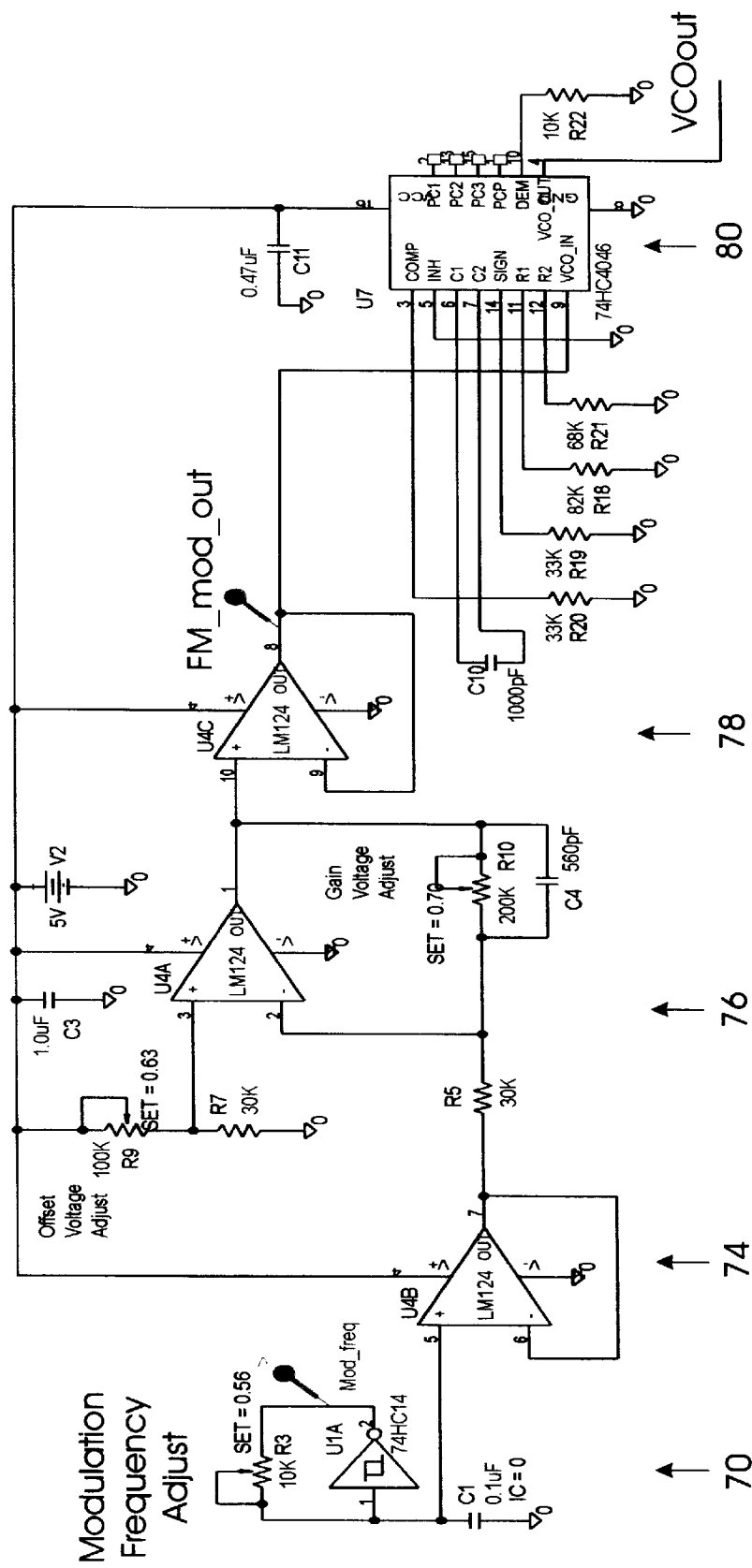
FIG. 7 shows the swept frequency generator which provides the input for the circuit of FIG. 6.

As shown in FIG. 7, an oscillator 70 is formed from a Schmidt inverter set up as an oscillator at 3 kHz output frequency. This frequency determines the drive frequency sweep rate. The inverter input is sawtooth in shape and corresponds to the charging and discharging of capacitor C1 through potentiometer R3. This sawtooth signal is passed through a high impedance buffer amplifier 74 that provides a constant input impedance to oscillator 70. The output of amplifier 74 signal is then amplified by amplifier 76 and shifted in offset voltage and passed though another buffer amplifier 78. The amplified 3 kHz signal is the input to the a phase locked loop voltage (PLL) voltage controlled oscillator (VCO) 80.

The frequency modulation circuit in FIG. 7 has two adjustments which allow close control of the drive frequency bandwidth. R9 at an input of amplifier 76 controls the OFFSET VOLTAGE ADJUST which moves the drive output bandwidth center up and down in frequency. R10 in oscillator 70 controls the amplifier gain and thus controls the bandwidth limits within the bandwidth limits set by the PLL's VCO 80. Typically, the PLL's bandwidth is set wider than is actually needed and the true bandwidth is controlled by the GAIN VOLTAGE ADJUST potentiometer at amplifier 76. If R10 is set to 0Ω, the VCO output frequency will be a constant determined by the offset voltage. The output of VCO 80 is bandwidth limited to approximately 130–190 kHz and is the input signal, 2f, to the digital drive circuit in FIG. 6.

Three motors were tested using this frequency modulation motor control scheme. Motors were chosen with PPFs that were determined experimentally to be within a 6 kHz range. The frequency modulation circuit was set up to sweep ±3 kHz from the average of the three PPFs. The modulation frequency was set at 3 kHz. This ensures that over a 60 ms duration when the motor is on, the drive frequency will be at the motors PPF approximately 360 times.

The torque of each motor was measured with a constant frequency source and the torque recorded. Next, the same driver circuit was used but the frequency source was a frequency modulated function generator. The results of this test are shown in Table 1. The frequency modulation torque is comparable to the torque obtained from a constant source. One measurement is higher but is probably within the output variation of the motor for a given constant frequency.

TABLE 1

| Motor | Motor PPF (kHz) | Constant Frequency Torque (mNM) | Frequency Modulation Range (kHz) | Frequency Modulation Torque (mNm) |
| --- | --- | --- | --- | --- |
| B | 76.0 | 1.56 | 78.0 +/−3 | 1.36 |
| C | 78.5 | 2.86 | 78.0 +/−3 | 2.99 |
| D | 82.0 | 2.46 | 78.0 +/−3 | 2.39 |

The frequency modulation scheme was tested in a system where a motor had to move an arm a series of short steps. The system was tested (pass/fail) through the entire range of steps in two ways. First, a constant frequency source was used as the input frequency for the drive electronics and second, a frequency modulated function generator was used as the input to the drive electronics. The system operated with the constant frequency source over a range of 4 kHz and over a range of 5 kHz with the modulated source. This test showed that the frequency modulation scheme of the invention would operate a motor over a 25% wider frequency range with the invention than application of a constant frequency.

While the embodiment discussed above utilized a sawtooth-type swept frequency modulation for the drive frequency (where the frequency increases linearly from a low value to a high value and then decreases linearly to the low value), it should be understood that the modulation may be sinusoidal or any other pattern. The important feature is that the drive frequency repeatedly changes over a range from $f_1-\Delta x$ to $f_1+\Delta y$, where $f_1$ is the nominal value of the frequency of peak performance for the motor.

The particular sizes and equipment discussed above are cited merely to illustrate a particular embodiment of this invention. It is contemplated that the use of the invention may involve components having different sizes and shapes as long as the principle discussed above is followed. It is intended that the scope of the invention be defined by the claims appended hereto.

What is claimed is:

1. A frequency modulation drive system consisting of:

an ac device that has peak performance at a specific frequency, $f_1$, wherein $f_1$ varies as a function of device and environmental factors; and an ac source connected to power said ac device, said ac source continuously generating a frequency over a range from $f_1-\Delta x$ to $f_1+\Delta y$, said range being greater than the expected variation of $f_1$;

wherein there is no feedback from said ac device to said ac source, and said motor operates at peak performance each time said frequency passes $f_1$.

2. The frequency modulation drive system of claim 1 wherein said ac device is a piezoelectric motor.

3. The frequency modulation drive system of claim 2 wherein said piezoelectric motor requires two drive signals, and said ac source comprises motor driver means for generating a first ac drive signal and a second ac drive signal identical, except 90° out of phase from, said first ac signal, said ac drive signals being connected to said motor.

4. The frequency modulation drive system of claim 3 wherein said ac source further comprises variable frequency oscillator means for providing an input to said motor driver means.

5. The frequency modulation drive system of claim 4 wherein said variable frequency oscillator output is an ac signal that is frequency modulated.

6. The frequency modulation drive system of claim 5 wherein said variable frequency oscillator means comprise a voltage controlled oscillator and a sweep generator having an output connected to an input of said voltage controlled oscillator.

7. A frequency modulation drive system consisting of:

a frequency modulated ac source for generating an ac signal having a swept frequency output from $f_1-\Delta x$ to $f_1+\Delta y$, a piezoelectric motor having a peak performance at frequency $f_1$, where $f_1$ has not been precisely determined; and drive circuitry for connecting said swept frequency output to said piezoelectric motor, said drive circuitry comprising:

means for generating two pair of digital signals, each pair being 180° out of phase with each other; and each signal from each pair of digital signals being 90° out of phase with a respective signal from the other pair of digital signals; and means for combining said four digital signals to form two identical ac drive signals that are 90° out of phase with each other, said drive signals being applied to said motor.

8. The frequency modulation drive system of claim 7 wherein said ac source comprises:

a voltage controlled oscillator for generating said ac signal proportional to an applied control signal; and said applied control signal being generated by a second oscillator; the output frequency of said second oscillator being lower than the frequency of said voltage controlled oscillator.

9. The frequency modulation drive system of claim 8 wherein the output of said second oscillator is an ac signal on a dc value, said system further comprising means for adjusting said dc value in order that the output of said voltage controlled oscillator includes $f_1$.

* * * * *